Patented Apr. 28, 1931

1,802,623

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS

ESTER OF TETRAHYDROFURFURYL ALCOHOL

No Drawing.    Application filed June 27, 1928. Serial No. 288,814.

This invention relates to an ester of tetrahydrofurfuryl alcohol, with a higher fatty acid. An example is tetrahydrofurfuryl laurate whose composition may be represented by the following structural formula:

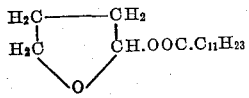

Other example are tetrahydrofurfuryl oleate, ricinoleate, linoleate, palmitate, and stearate.

A compound of this type may be made by the following procedure: A higher fatty acid is mixed with tetrahydrofurfuryl alcohol in slight excess, and a trace of sulfuric acid, say, 0.1 per cent of the weight of the fatty acid. There is then added benzol in amount equal, for example, to the combined weight of the other materials. The mixture is then heated sufficiently strongly to cause the passage of benzol and water vapor through fractionation equipment and then through a condenser. From the condensate, the lower aqueous layer is rejected; the upper layer, containing much benzol, is returned to the esterification. The process is continued until substantially all of the fatty acid is esterified. The sulfuric acid present is then neutralized as, for example, with an excess of soda, or is converted into a sulfate as, for example, by heating with an excess of potassium acetate.

The material is then heated in a partial vacuum, at, say, 4 mm. pressure and 160° C., in a slow stream of air, to remove acetic acid and other substances that are volatile under those conditions.

The material remaining in the flask is not appreciably volatile at ordinary temperatures and may be used, therefore, as a fixative of volatile substances.

In some cases, I have decolorized the tetrahydrofurfuryl esters of higher fatty acids by heating and subsequently filtering with decolorizing carbon before distilling away the benzol and other volatile materials, as indicated in the general method of preparation described above. In other cases, I have first distilled away the more volatile substances and then decolorized by heating with decolorizing carbon and filtering.

The tetrahydrofurfuryl esters of the higher fatty acids are insoluble in water, but soluble in hydrocarbons, as, for example, benzol and in certain esters, as, for example, butyl or ethyl acetates.

An example giving details of an illustrative preparation now follows. A mixture of tetrahydrofurfuryl alcohol, 51 parts by weight, lower fraction of acids from cocoanut oil, 93 parts, mean molecular weight 208, approximately 0.1 part of sulfuric acid and 175 parts of benzene was fractionated with continuous water separation for 11½ hours at 90-96° C. or until all of the organic acid had esterified. The mixture was then refluxed with a 200% excess of potassium acetate (to convert the sulfuric acid into a sulfate and liberate the corresponding amount of acetic acid) and fractionated in vacuo. The principal fraction distilled between 175° and 210° C. at 3-4 m. m. pressure and comprised tetrahydrofurfuryl laurate. This fraction is a liquid at ordinary temperatures, is insoluble in water, and miscible in all proportions with toluol, benzol, butyl acetate, or ethyl acetate.

Instead of the lower boiling fraction of cocoanut oil acids that was used in the above preparation, I may substitute the whole mixture of acids derived from cocoanut oil, as for example, a commercial variety such as "Armour's DD cocoanut oil fatty acids".

In distilling cocoanut oil fatty acids in vacuo, before their esterification with tetrahydrofurfuryl alcohol, I have, in some cases, discontinued the distillation when the temperature of vapor passing to the condenser just reaches, approximately, the boiling point of stearic acid at the prevailing pressure. Esterification of the distillate with tetrahydrofurfuryl alcohol, for example, gives an ester which contains a much smaller amount of stearate and still higher esters than is the case when the complete mixture of cocoanut oil fatty acids is esterified.

I claim:

1. A composition of matter comprising a tetrahydrofurfuryl ester of a fatty acid containing not less than six or more than eighteen carbon atoms to the molecule.

2. A composition of matter comprising a tetrahydrofurfuryl ester of a fatty acid containing more than ten carbon atoms to the molecule.

3. A composition of matter comprising tetrahydrofurfuryl laurate.

4. A composition of matter comprising a tetrahydrofurfuryl ester of a saturated fatty acid containing not less than six or more than eighteen carbon atoms to the molecule.

5. A composition of matter comprising a tetrahydrofurfuryl ester of a saturated fatty acid containing more than ten carbon atoms to the molecule.

6. A composition of matter comprising a tetrahydrofurfuryl ester of fatty acids mixed in about the same proportion to each other as that in which they occur in cocoanut oil.

7. A composition of matter comprising a tetrahydrofurfuryl ester of fatty acids mixed in about the same proportion to each other as that in which they occur in cocoanut oil, from which mixture of acids there has been eliminated, before esterification with the alcohol, a substantial proportion of acids containing more than 17 carbon atoms to the molecule.

ROBERT H. VAN SCHAACK, Jr.